US011810315B2

(12) United States Patent
Igarashi et al.

(10) Patent No.: US 11,810,315 B2
(45) Date of Patent: Nov. 7, 2023

(54) ALIGNMENT METHOD FOR USE IN PLANT

(71) Applicant: JGC CORPORATION, Kanagawa (JP)

(72) Inventors: Hiroteru Igarashi, Kanagawa (JP); Kyosuke Namba, Kanagawa (JP)

(73) Assignee: JGC CORPORATION, Kanagawa (JP)

(*) Notice: Subject to any disclaimer, the term of this patent is extended or adjusted under 35 U.S.C. 154(b) by 221 days.

(21) Appl. No.: 17/613,079

(22) PCT Filed: May 30, 2019

(86) PCT No.: PCT/JP2019/021578
§ 371 (c)(1),
(2) Date: Nov. 21, 2021

(87) PCT Pub. No.: WO2020/240784
PCT Pub. Date: Dec. 3, 2020

(65) Prior Publication Data
US 2022/0230349 A1    Jul. 21, 2022

(51) Int. Cl.
*G06T 7/70*     (2017.01)
*G06T 15/00*    (2011.01)
*G01B 11/26*    (2006.01)

(52) U.S. Cl.
CPC ............ *G06T 7/70* (2017.01); *G01B 11/26* (2013.01); *G06T 15/00* (2013.01)

(58) Field of Classification Search
CPC ......... G06T 7/70; G06T 15/00; G06T 1/0007; G06T 3/0093; G01B 11/26; G01B 11/24; G01B 11/002
See application file for complete search history.

(56) References Cited

FOREIGN PATENT DOCUMENTS

JP    H11153438         6/1999
JP    H11153438 A   *   6/1999
(Continued)

OTHER PUBLICATIONS

"International Search Report (Form PCT/ISA/210) of PCT/JP2019/021578," dated Aug. 13, 2019, with English translation thereof, pp. 1-2.

*Primary Examiner* — Bayan Salone
(74) *Attorney, Agent, or Firm* — JCIPRNET

(57) ABSTRACT

The alignment method includes: an acquisition step of acquiring a first two-dimensional image data group on a acquired first target object, and acquiring a second two-dimensional image data group on a acquired second target object; a conversion step of converting the first two-dimensional image data group into first three-dimensional image data, and converting the second two-dimensional image data group into second three-dimensional image data; a designation step of designating the target serving as an origin in each of images based on the first three-dimensional image data and the second three-dimensional image data; a setting step of setting three-dimensional coordinates with respect to the origin in the first and second three-dimensional image data through use of information on the origin designated in the designation step; and a position examination step of examining positions of the corresponding targets in the first three-dimensional image data and the second three-dimensional image data.

9 Claims, 6 Drawing Sheets

(56) References Cited

FOREIGN PATENT DOCUMENTS

| JP | 2003028614   | 1/2003 |
| JP | 2003028614 A * | 1/2003 |
| JP | 2012068062   | 4/2012 |
| JP | 2012068062 A * | 4/2012 |

* cited by examiner (a)

(b)

| target object A | target object B |
|---|---|
| (0,0,0) | (0,0,0) |
| (5.05,0,0) | (5.01,0,0) |
| (10.05,0,0) | (10.04,0,0) |
| (15.05,0,0) | (15.05,0,0) |
| (20.05,0,0) | (20.05,0,0) |
| (25.05,0,0) | (25.03,0,0) |
| (30.05,0,0) | (30.02,0,0) |
| (35.05,0,0) | (35.06,0,0) |
| (40.05,0,0) | (40.05,0,0) |

FIG. 6

| target object A | target object B | error | determination |
|---|---|---|---|
| (0,0,0) | (0,0,0) | | ○ |
| (5.05,0,0) | (5.01,0,0) | 0.04 | × |
| (10.05,0,0) | (10.04,0,0) | 0.01 | ○ |
| (15.05,0,0) | (15.05,0,0) | | ○ |
| (20.05,0,0) | (20.05,0,0) | | ○ |
| (25.05,0,0) | (25.03,0,0) | 0.02 | ○ |
| (30.05,0,0) | (30.02,0,0) | 0.03 | ○ |
| (35.05,0,0) | (35.06,0,0) | 0.01 | ○ |
| (40.05,0,0) | (40.05,0,0) | | ○ |

FIG. 7

ALIGNMENT METHOD FOR USE IN PLANT

CROSS-REFERENCE TO RELATED APPLICATION

This application is a 371 application of the international PCT application serial no. PCT/JP2019/021578, filed on May 30, 2019. The entirety of each of the above-mentioned patent applications is hereby incorporated by reference herein and made a part of this specification.

TECHNICAL FIELD

The present disclosure relates to an alignment method for use in a plant, of performing alignment of a target object being an installation target through use of 3D images in advance when a large-sized apparatus is to be installed on, for example, a construction site of the plant.

BACKGROUND ART

When a large-sized apparatus is to be installed on a construction site, the position and size of a bolt hole being a joining portion sometimes do not match those of a joining portion of an installation target object. In this case, an enormous amount of time is required for modifying the apparatus by, for example, expanding the bolt hole or changing the bolt hole into an elongated hole.

In order to reduce such unnecessary work, the apparatus is generally shipped after the joining portions are fitted to each other on trial in advance at a factory in which the apparatus is manufactured. Specifically, this trial fitting is work for confirming whether or not the installation target object can be fastened by inserting a bolt through the joining portions, and is called "trial fit up" or "trial assembly."

CITATION LIST

Patent Literature

[PTL 1] JP 2012-68062 A

SUMMARY OF INVENTION

Technical Problem

However, an actual apparatus is used to perform such trial fitting as described above, and hence the work itself requires enormous time and labor when an installation target object is a large-sized apparatus. In addition, when the installation target object is located at a high place, construction machinery and scaffolding are required. Under such circumstances, there has been a problem in that the trial fitting leads to an increase in cost and extension in schedule.

As a method that does not cause such time and labor as described above, there is also known an alignment device for acquiring a photograph of a joining portion, for example, a bolt hole, and comparing image data with design information in advance to perform alignment (see, for example, Patent Literature 1).

However, when the design information is used as in the case of this alignment device, the design information does not include a tolerance, and hence it is difficult to perform accurate alignment.

An object of the present disclosure is to provide an alignment method for use in a plant, which is capable of easily and accurately aligning joining portions.

Solution to Problem

According to one embodiment of the present disclosure, there is provided an alignment method for use in a plant, of aligning a first target object and a second target object to be joined to each other, the alignment method including: an insertion step of inserting a first jig having a target marked on a head of the first jig into a first hole portion formed in the first target object, and inserting a second jig having a target marked on a head of the second jig into a second hole portion formed in the second target object; a photographing step of acquiring a plurality of images of the first target object in which the first jig has been inserted into the first hole portion, and acquiring a plurality of images of the second target object in which the second jig has been inserted into the second hole portion; an acquisition step of acquiring a first two-dimensional image data group being a plurality of pieces of two-dimensional image data on the first target object which are acquired in the photographing step, and acquiring a second two-dimensional image data group being a plurality of pieces of two-dimensional image data on the second target object which are acquired in the photographing step; a conversion step of converting the first two-dimensional image data group into first three-dimensional image data, and converting the second two-dimensional image data group into second three-dimensional image data; a designation step of designating the target serving as an origin in each of an image based on the first three-dimensional image data and an image based on the second three-dimensional image data; a setting step of setting three-dimensional coordinates with respect to the origin in the first three-dimensional image data and the second three-dimensional image data through use of information on the origin designated in the designation step; and a position examination step of examining positions of the corresponding targets in the first three-dimensional image data and the second three-dimensional image data.

In this manner, the pieces of two-dimensional image data are each converted into the three-dimensional image data in advance, and the positions are examined, to thereby be able to accurately grasp an error in center positions of the first hole portion and the second hole portion. Therefore, it is possible to easily and accurately align joining portions.

Further, the alignment method for use in a plant according to one embodiment of the present disclosure further includes a modification step of modifying at least one of the first hole portion or the second hole portion based on alignment information obtained in the position examination step.

That is, the positions are examined in advance through use of the three-dimensional image data, and hence it is possible to quickly modify only a required hole portion through use of the alignment information obtained in the position examination step (by, for example, expanding the hole portion or changing the hole portion into an elongated hole).

Further, the alignment method for use in a plant according to one embodiment of the present disclosure further includes: a shipping step of shipping the first target object and the second target object under a state in which the at least one of the first hole portion or the second hole portion has been modified in the modification step; and a joining step of joining the first target object and the second target object that have been shipped in the shipping step.

That is, the positions are examined in advance through use of the three-dimensional image data, and the target objects are shipped to a construction site under the state in which the hole portion has been modified. Therefore, it is not required to perform alignment work and modifying work at the construction site, and it is possible to easily and quickly perform assembling work at low cost.

In the alignment method for use in a plant according to one embodiment of the present disclosure, the first jig and the second jig are each a plug having an inverted truncated cone shape.

In this manner, it is preferred to use a plug having an inverted truncated cone shape as the jig used for the alignment.

Further, in the alignment method for use in a plant according to one embodiment of the present disclosure, a target object completed by joining the first target object and the second target object to each other is a large-sized apparatus for a plant.

In this manner, according to the alignment method for use in a plant of one embodiment of the present disclosure, when a large-sized apparatus for a plant is to undergo a joining process, it is no longer required to perform large-scale trial fitting work using, for example, construction machinery and scaffolding at a factory, to thereby be able to reduce a work load at the factory.

Advantageous Effects of Invention

According to the present disclosure, it is possible to provide the alignment method for use in a plant, which is capable of easily and accurately aligning the joining portions.

BRIEF DESCRIPTION OF DRAWINGS

FIG. 6 is a table for showing coordinates of targets displayed on a display unit of the alignment device for a plant in the embodiment.

FIG. 7 is a table for showing coordinates of targets displayed on a display unit of the alignment device for a plant in another embodiment.

DESCRIPTION OF EMBODIMENTS

Figure 1:
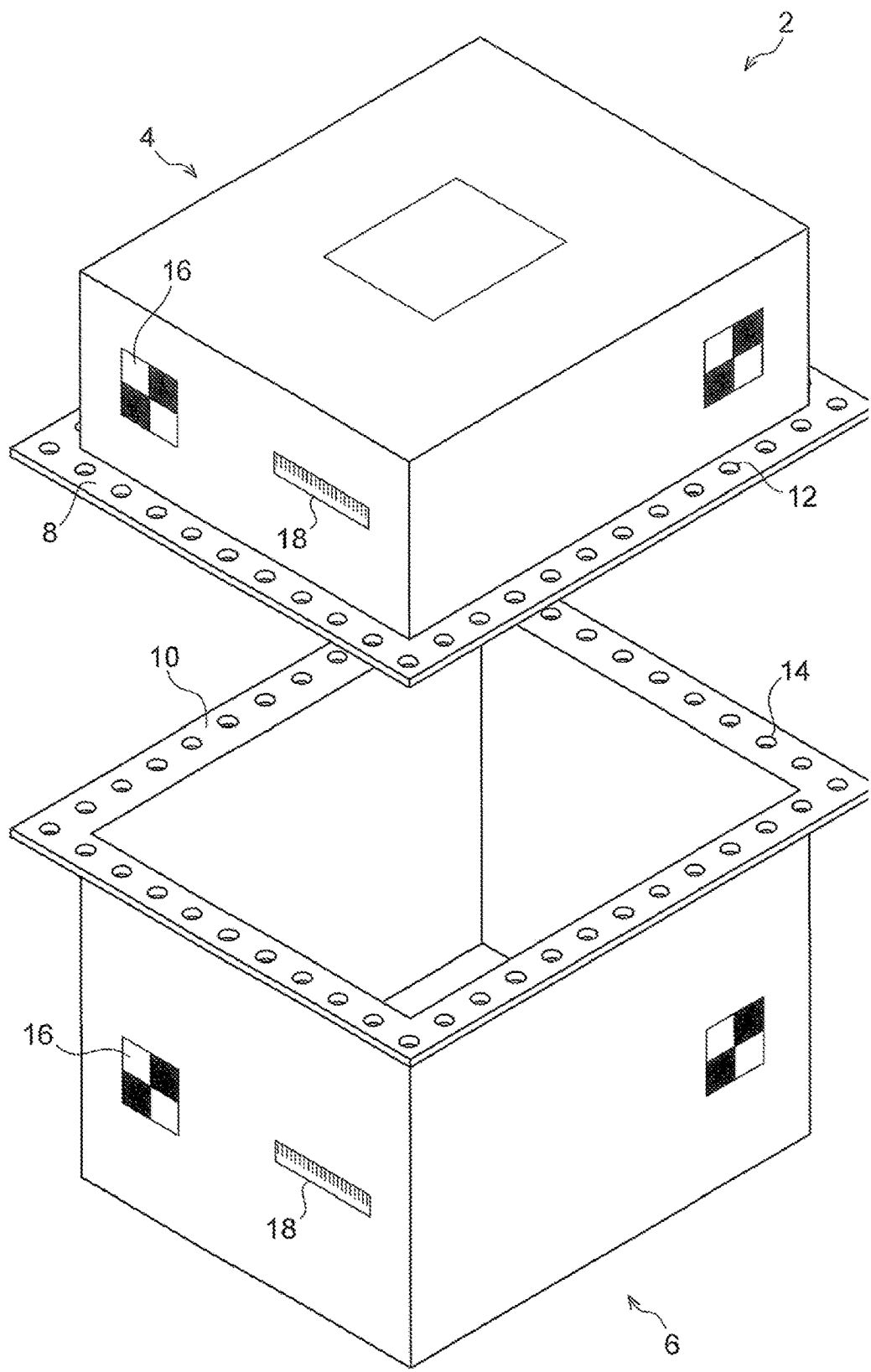
FIG. 1 is a perspective view of a target object to be subjected to alignment through use of an alignment method for use in a plant according to an embodiment, as viewed from above.

Now, an alignment method for use in a plant according to an embodiment of the present disclosure is described with reference to the accompanying drawings. FIG. 1 is a perspective view for illustrating a target object to be subjected to alignment through use of the alignment method for use in a plant according to the embodiment. In this case, a furnace frame of a combustion apparatus is illustrated as an example of a target object 2. As illustrated in FIG. 1, the target object 2 is formed by joining a first target object 4 and a second target object 6.

The first target object 4 and the second target object 6 each have a rectangular parallelepiped shape, and have flanges 8 and 10, respectively, at edges of opening portions facing each other. First hole portions 12 and second hole portions 14 are formed in the flanges 8 and 10, respectively, as bolt holes at predetermined intervals. In addition, a singular point 16 (for example, a QR code (trademark), a marker, a tiger rope, a bar code, character information, or a sphere) and a scale 18 are attached to each of outer surfaces of the first target object 4 and the second target object 6. The singular point 16 and the scale 18 may be arranged in vicinities of the first target object 4 and the second target object 6 instead of being attached thereto so as to be photographed together with the first target object 4 and the second target object 6 at a time of photographing described later.

Figure 2:
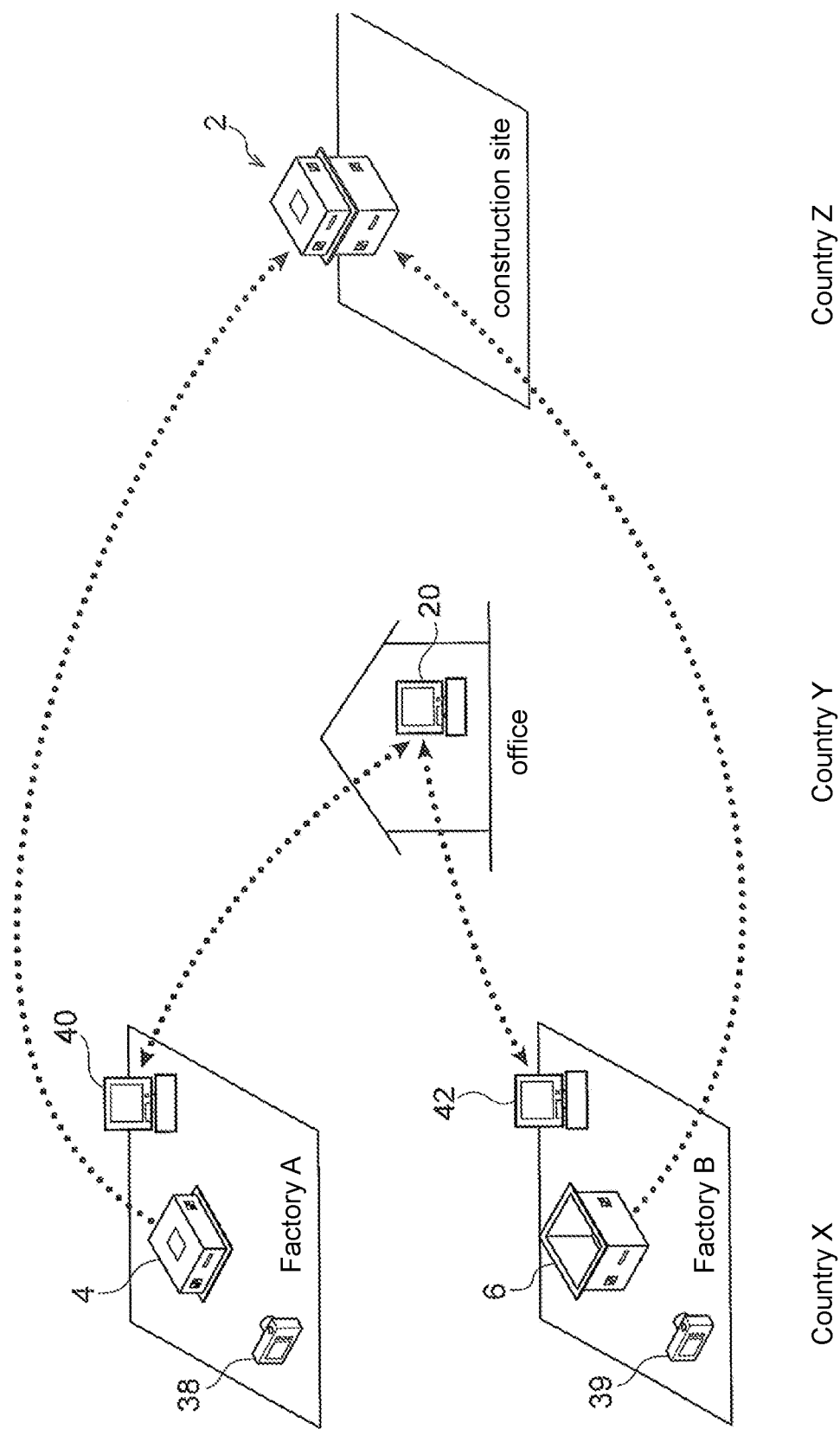
FIG. 2 is a conceptual view for illustrating an example of production sites (for example, factories) and an assembly site (for example, a construction site) of the target object to be subjected to alignment through use of the alignment method for use in a plant according to the embodiment.

FIG. 2 is a conceptual view for illustrating an example of production sites (for example, factories) and an assembly site (for example, a construction site) of the target object 2. As illustrated in FIG. 2, for example, the first target object 4 is manufactured at Factory A in Country X, the second target object 6 is manufactured at Factory B in Country X, and the first target object 4 and the second target object 6 are assembled at a plant construction site in Country Y, to thereby complete the target object 2. In this case, an alignment device 20 for a plant in the embodiment is arranged in an office in Country Z.

Figure 3:
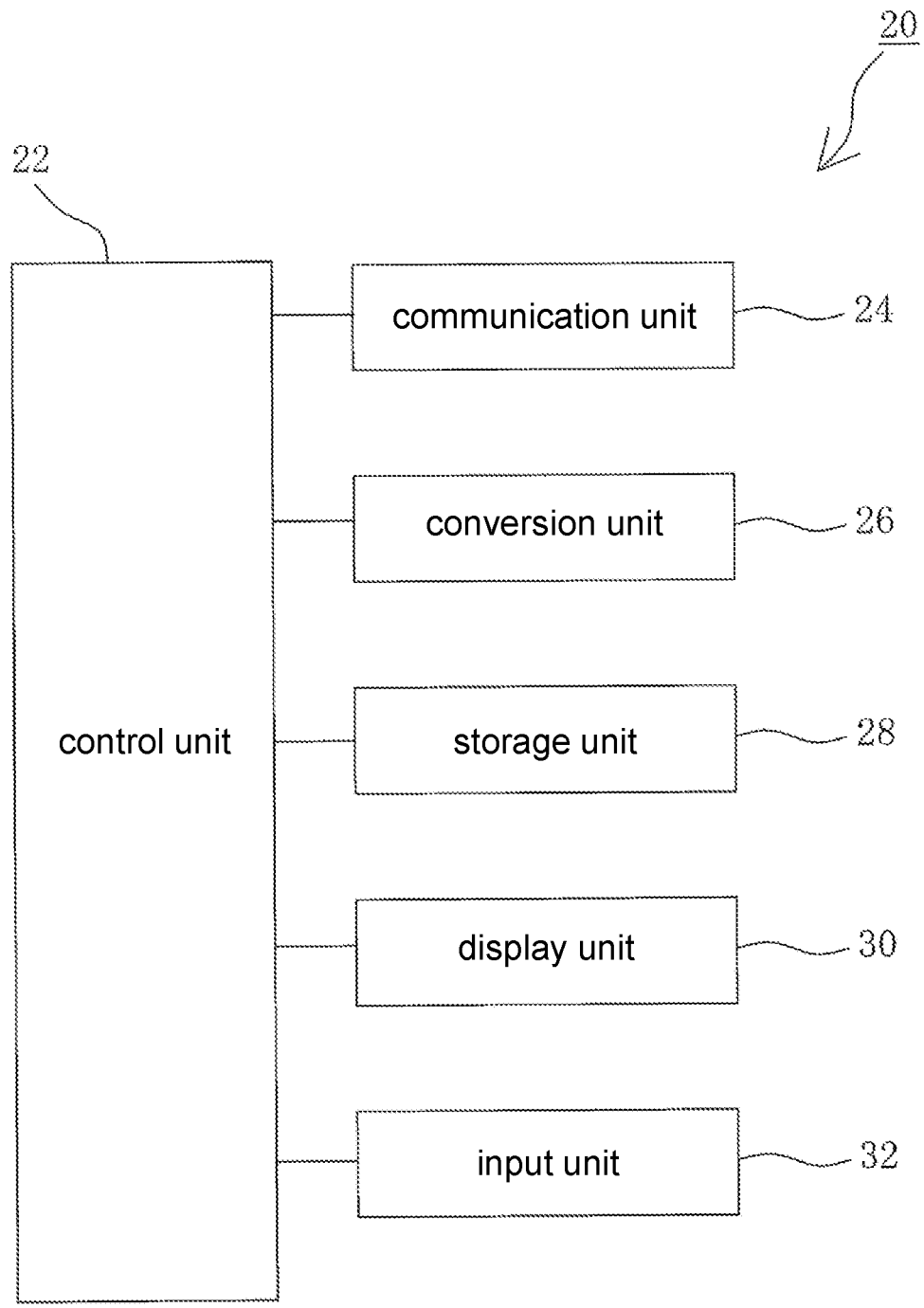
FIG. 3 is a block diagram for illustrating the structure of an alignment device for a plant in the embodiment.

Next, the alignment device 20 for a plant in the embodiment is described. FIG. 3 is a block diagram for illustrating the structure of the alignment device 20 for a plant in the embodiment. The plant alignment device 20 is used for aligning the first target object 4 and the second target object 6 to be joined to each other. As illustrated in FIG. 3, the alignment device 20 for a plant includes a control unit 22 for controlling each unit, and the control unit 22 is connected to a communication unit 24 for communicating to/from a terminal 40 of Factory A and a terminal 42 of Factory B, a conversion unit 26 for converting a plurality of pieces of two-dimensional image data into one piece of three-dimensional image data, a storage unit 28 for storing the three-dimensional image data, a display unit 30 for displaying an image based on the three-dimensional image data, and an input unit 32 for inputting required information into the image displayed on the display unit 30. Examples of the input unit 32 include a touch panel for inputting information by a touch operation.

Figure 4:
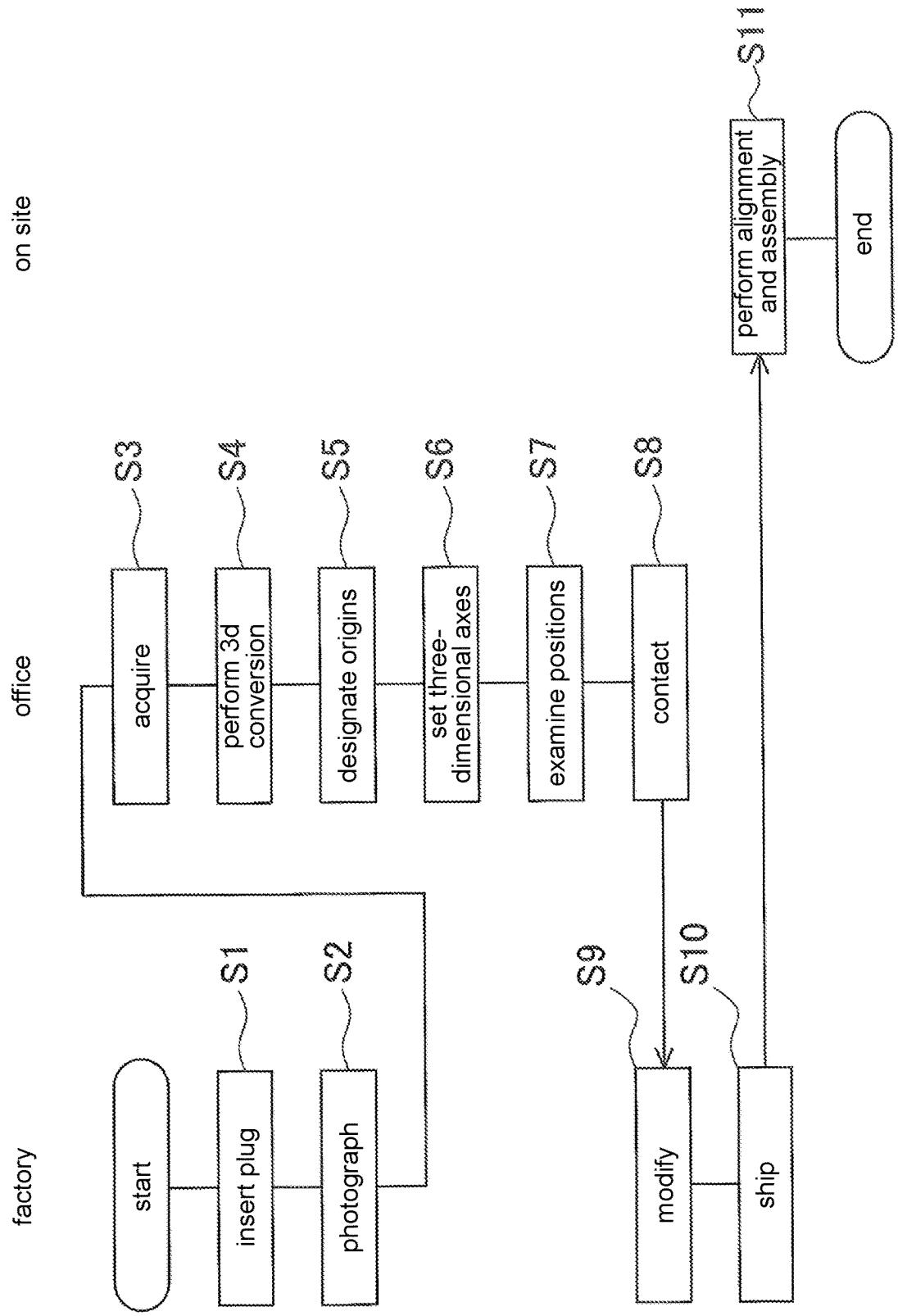
FIG. 4 is a flow chart for illustrating processing involved in the alignment method for use in a plant according to the embodiment.
Figure 5:
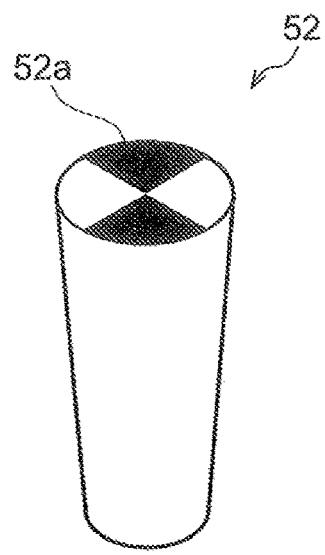
FIG. 5 are views for illustrating a jig (plug) to be used for joining target objects in the embodiment and joining portions into which jigs have been inserted, respectively.
Figure 5:
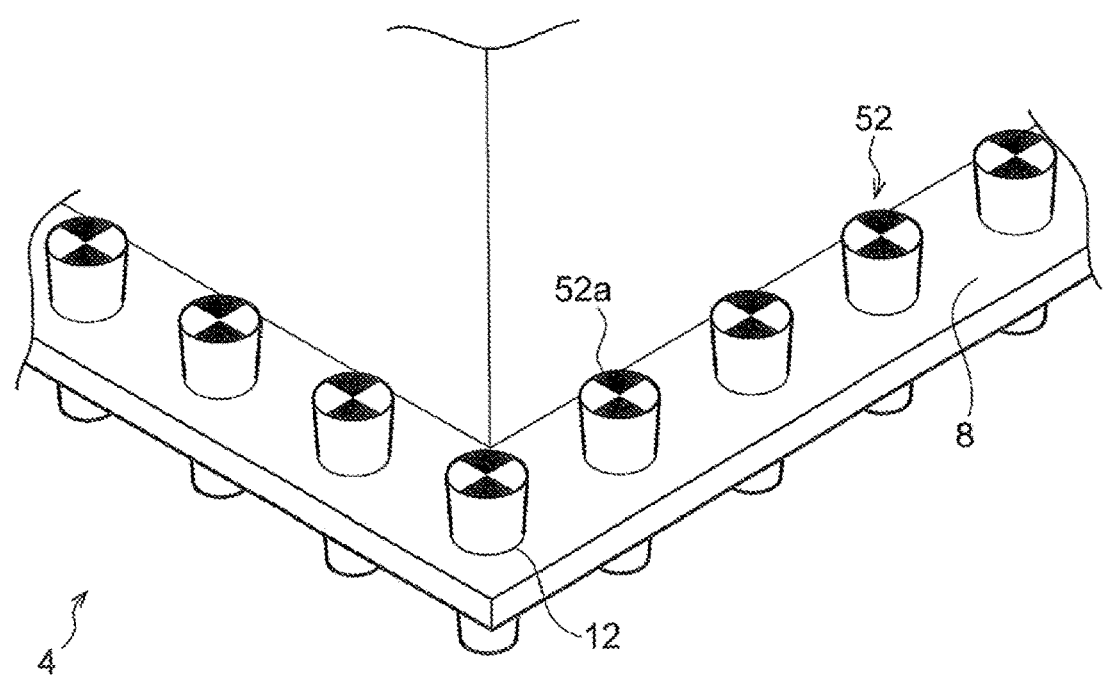

Next, the alignment method for use in a plant in the embodiment, of performing processing for performing the alignment of the target object 2, that is, aligning the first target object 4 and the second target object 6 to be joined to each other, is described with reference to a flow chart illustrated in FIG. 4. First, at Factory A, plugs 52 each of which is illustrated in FIG. 5(a) are provided. The plug 52 is an inverted-truncated-cone-shaped component having a larger diameter at a position closer to its head, and a target 52a is marked on the head. As illustrated in FIG. 5(b), the plugs 52 are inserted into the first hole portions 12 formed in the flange 8 of the first target object 4 so that the targets 52a are positioned on a surface side of the flange 8, which is opposite to its surface to be joined. Each plug 52, which has a shape having a larger diameter at a position closer to the head, is inserted into the first hole portion 12 without a gap (insertion step, Step S1). In the same manner, the plugs 52 are provided at Factory B, and inserted into the second hole portions 14 formed in the flange 10 of the second target object 6.

Next, the first target object 4 is photographed through use of a camera 38 under a state in which the plugs 52 (first jigs)

are inserted into the first hole portions 12 in the flange 8 (photographing step, Step S2). The photographing is performed from various angles. As the camera 38, for example, a digital camera or a smartphone is used. At Factory B, in the same manner as the first target object 4, the second target object 6 is photographed through use of a camera 39 under a state in which the plugs 52 (second jigs) are inserted into the second hole portions 14 in the flange 10.

At Factory A, a plurality of acquired images are recorded in the terminal 40 as a first two-dimensional image data group. At Factory B, a plurality of acquired images are recorded in the terminal 42 as a second two-dimensional image data group. Examples of the terminals 40 and 42 include a personal computer, and the recording of the first two-dimensional image data group and the second two-dimensional image data group into the terminal 40 and 42 is performed by replacing, for example, a memory card from the cameras 38 and 39 to the terminals 40 and 42, respectively. Subsequently, the first two-dimensional image data group of the first target object 4 and the second two-dimensional image data group of the second target object 6, which have been obtained through the photographing, are transmitted from the terminals 40 and 42, respectively, to the alignment device 20 for a plant arranged in the office in Country Z by, for example, electronic mail.

When the control unit 22 receives (acquires) the first two-dimensional image data group through the communication unit (acquisition step, Step S3), the control unit 22 controls the conversion unit 26 to convert the first two-dimensional image data group into one piece of first three-dimensional image data (conversion step, Step S4). At a time of the conversion, respective first two-dimensional image data is joined to one another through use of the singular points 16 included in the first two-dimensional image data. In addition, scales of the respective two-dimensional image data are unified through use of the scale 18. In the same manner, after the second two-dimensional image data group is received, the second two-dimensional image data group is converted into one piece of second three-dimensional image data. The conversion into the three-dimensional image data is performed through use of a publicly known technology. The first three-dimensional image data and the second three-dimensional image data are stored in the storage unit 28.

Subsequently, the control unit 22 reads out the first three-dimensional image data and the second three-dimensional image data from the storage unit 28, and displays images based on the respective three-dimensional image data on the display unit 30, for example, side by side. The image may be displayed on the display unit 30 by an operator's own operation. In this case, while viewing the image of the first target object 4 and the image of the second target object 6 that are displayed on the display unit 30, the operator designates the target 52a serving as the origin of each target object by, for example, a touch operation (designation step, Step S5). After each origin is determined, the operator sets three-dimensional coordinate axes with respect to the origin in each piece of the first three-dimensional image data and the second three-dimensional image data (setting step, Step S6). In this manner, the three-dimensional coordinate axes are set for each piece of the first three-dimensional image data and the second three-dimensional image data, to thereby enable objective recognition of center positions of each first hole portion 12 and each second hole portion 14.

Subsequently, after the control unit 22 identifies the coordinates of each target 52a on the three-dimensional coordinate axes in the image based on each piece of three-dimensional image data, the control unit 22 may further display a table of the identified coordinates on the display unit 30 as shown in FIG. 6. The table of those and a pair of a first three-dimensional image and a second three-dimensional image may be displayed together, or only one thereof may be displayed.

Subsequently, while viewing the table of the coordinates, the first three-dimensional image, and the second three-dimensional image displayed on the display unit 30, the operator aligns the corresponding targets 52a in the first three-dimensional image data and the second three-dimensional image data, that is, examines the coordinate positions of the corresponding targets 52a (position examination step, Step S7). Subsequently, the operator grasps the targets 52a having corresponding coordinate positions falling out of an allowable error, and contacts a worker in charge of the first target object 4 by telephone or the like to notify the worker of the position of the first hole portion 12 in which one of the targets 52a having the corresponding coordinate positions falling out of the allowable error is arranged, as alignment information. In the same manner, the operator contacts a worker in charge of the second target object 6 by telephone or the like to notify the worker of the position of the second hole portion 14 in which the other one of the targets 52a having the corresponding coordinate positions falling out of the allowable error is arranged, as alignment information (contact step, Step S8).

When the workers in charge are contacted, the workers modify the first hole portion 12 and the second hole portion 14 corresponding to the targets 52a that fall out of the allowable error based on the alignment information by, for example, expanding the first hole portion 12 and the second hole portion 14 or changing the first hole portion 12 and the second hole portion 14 into elongated holes, respectively (modification step, Step S9). After the modification, the first target object 4 and the second target object 6 are shipped from Factory A and Factory B, respectively, to the construction site in Country Y (shipping step, Step S10). When it is sufficient that the modification is performed on any one of the first target object 4 and the second target object 6, any one of the first target object 4 and the second target object 6 is shipped without being modified. In this case, in the contact step (Step S8), it is not required to contact a worker in charge of the target object 2 that is not required to be modified.

When a person in charge of the construction site in Country Y receives the first target object 4 and the second target object 6, the person aligns the positions of each first hole portion 12 formed in the flange 8 of the first target object 4 and each second hole portion 14 formed in the flange 10 of the second target object 6, and inserts a bolt through each first hole portion 12 and each second hole portion 14 to join the first target object and the second target object 6 (joining step, Step S11), to thereby complete the target object 2.

According to the alignment method for use in a plant of this embodiment, the first target object 4 in which the plug 52 having the target 52a marked on the head has been inserted into each first hole portion 12 and the second target object 6 in which the same plug 52 has been inserted into each second hole portion 14 are each photographed, the pieces of two-dimensional image data on the first target object 4 and the second target object 6 are each converted into three-dimensional image data, and the three-dimensional coordinate axes are set therefor, to thereby be able to accurately grasp an error in center positions of each first hole portion 12 and each second hole portion 14. Therefore, the first target object 4 and the second target object 6 are shipped to the construction site after such an error is previously grasped and work for modifying this error is performed in advance at the factory, to thereby be able to easily and accurately align the joining portions of the first target object 4 and the second target object 6 at the construction site.

That is, according to the alignment method for use in a plant of this embodiment, the same effect as that of "trial fit up" can be obtained through use of the three-dimensional image data, and the alignment work is no longer required at the factory or the construction site. Therefore, the cost required for the alignment can be significantly reduced, and the schedule can be shortened.

In the above-mentioned embodiment, as illustrated in FIG. 2, the first target object 4 and the second target object 6 are located in Country X, the construction site is located in Country Y, and the alignment device 20 for a plant is located in Country Z, but those locations are not limited to different countries. For example, the first target object 4, the second target object 6, the alignment device 20 for a plant, and the construction site may be located in slightly distant places on the same site. In this case, the acquisition unit is not required to be the communication unit 24, and may be, for example, connected to the cameras 38 and 39 or the terminals 40 and 42 in a wired manner.

Further, in the above-mentioned embodiment, the input unit 32 is not limited to the touch panel, and may be, for example, a mouse or a keyboard. In this case, the operator operates the mouse while viewing the display unit 30, and uses a pointer to designate the target 52a as the origin.

Further, in the photographing step (Step S2) in the above-mentioned embodiment, the first two-dimensional image data group and the second two-dimensional image data group after the photographing are not required to be stored in the terminals 40 and 42, respectively. For example, a memory card or a CD in which the first two-dimensional image data group and the second two-dimensional image data group are recorded may be mailed to the office in Country Z. In this case, when, for example, the memory card or the CD is connected to the alignment device 20 for a plant on the office in Country Z, the first two-dimensional image data group and the second two-dimensional image data group are read into the alignment device 20 for a plant. In another case, the first two-dimensional image data group and the second two-dimensional image data group after the photographing may be directly transmitted from the cameras 38 and 39 to the alignment device 20 for a plant by, for example, electronic mail.

Further, in the setting step (Step S6) for three-dimensional axes in the above-mentioned embodiment, the three-dimensional coordinate axes with respect to the origins are manually set, but the control unit 22 may use information on designated origins to set the three-dimensional coordinate axes with respect to the origins in the first three-dimensional image data and the second three-dimensional image data.

Further, in the position examination step (Step S7) in the above-mentioned embodiment, the control unit 22 may determine whether or not an error in coordinates of each target 52a falls within an allowable error set in advance. For example, as shown in FIG. 7, the target 52a that falls within the allowable error is displayed by "○" or the like, and the target 52a that falls out of the allowable error is displayed by "x" or the like. FIG. 7 shows an exemplary case in which an error of less than 0.04 falls within an allowable range. In addition, the allowable error can be freely set by, for example, the operator, and the set allowable error is stored in a storage unit (not shown).

Subsequently, when a predetermined notification operation is performed by the operator, the control unit 22 transmits the coordinates of the target 52a that falls out of the allowable error to the terminal 40 of Factory A and the terminal of Factory B as the alignment information through the communication unit 24 (contact step, Step S8). Specifically, the notification is performed by transmitting the coordinates (5.05, 0, 0) in the first target object 4 and the corresponding coordinates (5.01, 0, 0) in the second target object 6 by, for example, electronic mail.

The terminals 40 and 42 that have received the notification inform a person in charge of managing the terminal 40 at Factory A and a person in charge of managing the terminal at Factory B, respectively, that the notifications of the coordinates have been received, by notification means, for example, alarms. The persons in charge who have received the informed notifications report details of the received notifications to the worker in charge of the first target object 4 and the worker in charge of the second target object 6, respectively.

In this case, the information transmitted in the contact step is not limited to the coordinates of the target 52a that falls out of the allowable error, and the coordinates of the corresponding pair of targets 52a may be transmitted to the terminal 40 of Factory A and the terminal 42 of Factory B as the alignment information.

Further, in the above-mentioned embodiment, the plug 52 is used as the jig having the target 52a being displayed on the head, but as a jig other than the plug 52, for example, a peg or a wedge may be used as the tool for the alignment.

The invention claimed is:

1. An alignment method, of aligning a first target object and a second target object to be joined to each other in a target object installed on a plant, the alignment method comprising:
    an acquisition step of acquiring a first two-dimensional image data group being a plurality of pieces of two-dimensional image data obtained by photographing multiple times under a state in which a first jig having a target marked on a head of the first jig is inserted into a first hole portion formed in the first target object, and acquiring a second two-dimensional image data group being a plurality of pieces of two-dimensional image data obtained by photographing multiple times under a state in which a second jig having a target marked on a head of the second jig is inserted into a second hole portion formed in the second target object;
    a conversion step of converting the first two-dimensional image data group into first three-dimensional image data, and converting the second two-dimensional image data group into second three-dimensional image data;
    a designation step of designating the target serving as an origin in each of an image based on the first three-dimensional image data and an image based on the second three-dimensional image data;
    a setting step of setting three-dimensional coordinates with respect to the origin in the first three-dimensional image data and the second three-dimensional image data through use of information on the origin designated in the designation step; and
    a position examination step of examining positions of the corresponding targets in the first three-dimensional image data and the second three-dimensional image data.

2. The alignment method according to claim 1, further comprising a modification step of modifying at least one of the first hole portion or the second hole portion based on alignment information obtained in the position examination step.

3. The alignment method according to claim 2, further comprising:
- a shipping step of shipping the first target object and the second target object under a state in which the at least one of the first hole portion or the second hole portion has been modified in the modification step; and
- a joining step of joining the first target object and the second target object that have been shipped in the shipping step.

4. The alignment method according to claim 1, wherein the first jig and the second jig each comprise a plug having an inverted truncated cone shape.

5. The alignment method according to claim 1, wherein a target object completed by joining the first target object and the second target object to each other comprises a large-sized apparatus for a plant.

6. The alignment method according to claim 1, further comprising a photographing step of photographing the first target object multiple times under the state in which the first jig is inserted into the first hole portion, and photographing the second target object multiple times under the state in which the second jig is inserted into the second hole portion.

7. The alignment method according to claim 6, wherein the photographing of the first target object and the photographing of the second target object are performed at different points in the photographing step.

8. The alignment method according to claim 1, wherein the acquiring of the first two-dimensional image data group and the second two-dimensional image data group is performed through a communication means in the acquisition step.

9. An alignment device, of aligning a first target object and a second target object to be joined to each other in a target object installed on a plant, the alignment device comprising:
- a communication unit, acquiring a first two-dimensional image data group being a plurality of pieces of two-dimensional image data obtained by photographing multiple times under a state in which a first jig having a target marked on a head of the first jig is inserted into a first hole portion formed in the first target object, and acquiring a second two-dimensional image data group being a plurality of pieces of two-dimensional image data obtained by photographing multiple times under a state in which a second jig having a target marked on a head of the second jig is inserted into a second hole portion formed in the second target object;
- a conversion unit, converting the first two-dimensional image data group into first three-dimensional image data, and converting the second two-dimensional image data group into second three-dimensional image data;
- a display unit, displaying to designate the target serving as an origin in each of an image based on the first three-dimensional image data and an image based on the second three-dimensional image data;
- a control unit, setting three-dimensional coordinates with respect to the origin in the first three-dimensional image data and the second three-dimensional image data through use of information on the designated origin; and
- a determination unit, determining examination positions of the corresponding targets in the first three-dimensional image data and the second three-dimensional image data.

* * * * *